United States Patent
Woodward et al.

(10) Patent No.: US 8,925,044 B2
(45) Date of Patent: Dec. 30, 2014

(54) SYSTEM AND METHOD FOR WLAN ROAMING TRAFFIC AUTHENTICATION (75) Inventors: Paul Thomas Woodward, London (GB); Shahzad Subedar, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 13/638,814

(22) PCT Filed: Mar. 30, 2011

(86) PCT No.: PCT/GB2011/000487
§ 371 (c)(1),
(2), (4) Date: Oct. 1, 2012

(87) PCT Pub. No.: WO2011/121295
PCT Pub. Date: Oct. 6, 2011

(65) Prior Publication Data
US 2013/0031615 A1    Jan. 31, 2013

(30) Foreign Application Priority Data

Mar. 30, 2010  (EP) .................................... 10250654

(51) Int. Cl.
*G06F 7/04*    (2006.01)
*H04W 8/02*    (2009.01)
(Continued)

(52) U.S. Cl.
CPC ............... *H04W 8/02* (2013.01); *H04W 12/06* (2013.01); *H04L 67/02* (2013.01);*H04W 8/26* (2013.01);
(Continued)

(58) Field of Classification Search
CPC ............ H04L 63/0884; H04L 63/0876; H04L 63/1483; H04L 63/02; G06F 21/00
USPC ......... 726/4, 12, 3, 8; 370/338, 352; 380/277; 455/433; 709/223
See application file for complete search history.

(56) References Cited

U.S. PATENT DOCUMENTS 7,453,852 B2 *  11/2008  Buddhikot et al. ........... 370/331
7,849,177 B2 *  12/2010  Uhlik ............................ 709/223
(Continued)

FOREIGN PATENT DOCUMENTS

WO   WO 2005/013582    2/2005
WO   WO 2006/118497    11/2006

OTHER PUBLICATIONS

Salkintizis A.K, Interworking techniques and architectures for WLAN/3G integration towards 4G mobile data networks, Jun. 2004, IEEE, vol. 3, pp. 50-61.*

(Continued)

*Primary Examiner* — Dede Zecher
*Assistant Examiner* — Viral Lakhia
(74) *Attorney, Agent, or Firm* — Nixon & Vanderhye P.C.

(57) ABSTRACT

A system and method for recognizing traffic generated from an authenticated a device roaming in a wireless local area network and related aspects are provided. An authentication server is arranged to authorize communications traffic originating from a wireless access point to use a roaming service, the traffic comprising an NAT translated IP address. The server first authorizes a WLAN roaming device, and then processes a meta-data message received from a WLAN access point in which the source address of the message comprises the source address of the roaming device at the WLAN access point. The server then determines, from the information provided in the meta-data message when it is received by the authentication server, which includes at this point a NAT translated source address in the meta-data message what the NAT translated source address of traffic from said NAT translated source address. In this way, all traffic generated by the roaming device while that NAT translated IP address is valid is automatically authorized to use a roaming service to access the internet.

4 Claims, 5 Drawing Sheets (51) Int. Cl.
  *H04W 12/06* (2009.01)
  *H04L 29/08* (2006.01)
  *H04W 8/26* (2009.01)
  *H04L 29/12* (2006.01)
  *H04W 12/08* (2009.01)
  *H04W 84/12* (2009.01)

(52) U.S. Cl.
  CPC ............... *H04L 61/25* (2013.01); *H04W 12/08* (2013.01); *H04W 84/12* (2013.01)
  USPC ............ 726/4; 726/1; 726/3; 726/8; 709/223; 455/433

(56) References Cited

U.S. PATENT DOCUMENTS

| | | | |
|---|---|---|---|
| 7,924,780 B2 | 4/2011 | Waisman-Diamond | |
| 7,953,227 B2* | 5/2011 | Meier et al. | 380/277 |
| 7,996,894 B1* | 8/2011 | Chen et al. | 726/22 |
| 8,238,326 B2* | 8/2012 | Kant et al. | 370/352 |
| 8,520,609 B2* | 8/2013 | Singh et al. | 370/329 |
| 8,584,207 B2* | 11/2013 | Dommety et al. | 726/4 |
| 2005/0185626 A1 | 8/2005 | Meier et al. | |
| 2006/0098614 A1 | 5/2006 | Moon et al. | |
| 2006/0104262 A1* | 5/2006 | Kant et al. | 370/352 |
| 2006/0117104 A1 | 6/2006 | Taniguchi et al. | |
| 2006/0264201 A1 | 11/2006 | Zhang | |
| 2006/0271796 A1* | 11/2006 | Kaimal et al. | 713/194 |
| 2007/0022469 A1* | 1/2007 | Cooper et al. | 726/3 |
| 2007/0094401 A1 | 4/2007 | Gagne et al. | |
| 2007/0112948 A1* | 5/2007 | Uhlik | 709/223 |
| 2008/0102829 A1* | 5/2008 | Jiang | 455/433 |
| 2009/0040995 A1* | 2/2009 | Buddhikot et al. | 370/338 |
| 2009/0144809 A1* | 6/2009 | Dommety et al. | 726/4 |
| 2010/0125899 A1 | 5/2010 | Tinnakornsrisuphap et al. | 726/12 |
| 2010/0325714 A1* | 12/2010 | Iyer et al. | 726/8 |

OTHER PUBLICATIONS

International Search Report for PCT/GB2011/000487, mailed May 24, 2011.

* cited by examiner

SYSTEM AND METHOD FOR WLAN ROAMING TRAFFIC AUTHENTICATION

This application is the U.S. national phase of International Application No. PCT/GB2011/000487 filed 30 Mar. 2011 which designated the U.S. and claims priority to EP 10250654.0 filed 30 Mar. 2010, the entire contents of each of which are hereby incorporated by reference.

BACKGROUND

The present invention relates to a system and method for recognising traffic generated from an authenticated device roaming in a wireless local area network and related aspects. In particular, but not exclusively, the invention relates to a method of determining if traffic having a network address translated (NAT) Internet Protocol (IP) source address comprises traffic generated by a device authorised to use a roaming communications service accessed via a wireless local area network and to related aspects.

Some wireless local area network access points, for example, the network access point device marketed by British Telecommunications plc as the HomeHub™, are arranged to support networks with different Service Set IDentifers (SSIDs). This enables traffic separation between guest users' devices within the area of the wireless network connectivity offered by the access point to the internet and a service subscriber's devices which also use the same access point to access the internet.

One benefit of sharing the wireless network coverage in this way to the service provider is that a wide area network is created without the installation costs and associated maintenance costs being the responsibility of the service provider. The configuration of the access points to provide such shared access with guest users is encouraged as the service subscriber for any particular internet service using the access point is then able to participate in the scheme and so also benefit from the roaming service that the shared access rights support.

However, unsolicited use of a registered user's wireless local area network (WLAN) has several implications. For example, the level of guest traffic should not prevent the service subscriber from having access to the internet which meets certain service level conditions. Use of the roaming service may need to be monitored, for example, to support only authenticated users enjoying the roaming rights, and also to monitor the type of use being made of such networks by guest users.

Distinguishing use of the access point by a device registered to a service subscriber associated with that access point and use of the network the access point provides by a device associated with guest or roaming users is particularly important for monitoring malicious, abusive, illegal or anti-social purposes, including for example, usage of interest from a national security perspective. Traffic separation schemes are known in the art which distinguish the use of the access point by ensuring a service subscriber's use of an access point is associated with a separate network SSID from the SSID of the wireless LAN the access point provides for ad hoc use by guests.

For example, the International Patent Application having the publication number WO2009/022052 entitled "Network Access for a Visiting User" describes how a visitor's device can request a network address (for example, an IP address) using a suitable protocol (e.g. the Dynamic Host Configuration Protocol) from an access point which issues an IP address to the visitor's device. When the terminal attempts to communicate with the internet (e.g. tries to open a connection to a WWW service) the base station opens a VPN tunnel automatically from the user's point of view, whereby all of the visitor's traffic is automatically routed through a VPN hub to a captive portal. The captive portal intercepts all transmitted packets and redirects the connection through to a login page (i.e., the captive portal opens a login page on the visitor's device) and does not allow the customer's traffic to propagate further before login.

The United States Patent Application having the publication number US2007/0268914 entitled "Tenant Network Controller Apparatus and Method" describes a LAN controller which can associate a MAC address with a geographic location.

The United States Patent Application having the publication number US2008/0200148 entitled "Method and System for Providing Network Access and Services using Access Codes" describes an authorization and access control system for a venue or a geographic region comprising a plurality of venues.

The European Patent Application having the publication number EP1850532 entitled "Method of providing a guest terminal with emergency access over a WLAN" describes providing an emergency SSID to allow access to a LAN in an emergency.

The United States Patent having the publication number U.S. Pat. No. 7,630,401 entitled "Bandwidth Management in a Network" describes how the transmission rate of a network device can be adjusted based on the network bandwidth utilisation.

The United States Patent Application having the publication number US2008/0117836 entitled "Methods and apparatus to manage bandwidth in a wireless network" describes a wireless network access point supports both a private SSID and a public SSID which has a policy interface which enables the setting of a permissible public bandwidth on the public SSID and a bandwidth allocator to control usage of the permissible public bandwidth.

The United States Patent Application having the publication number US2009/0201946 entitled "Dynamic DSL Line Bandwidth Management with the Subscriber's Consent" describes how bandwidth can be borrowed from non-critical subscriber services to meet the increased bandwidth of other subscriber services.

The United States Patent Application having the publication number US2008/0008140 entitled "Conditional Utilization of Private Short-Range Wireless Networks for Service Provision and Mobility" describes how a private short-range network can be integrated into a service/mobility domain.

The United States Patent Application having the publication number US2008/0144588 entitled "Method and Apparatus of Prioritizing Services of Wireless Local Area Network" describes how an access point which may send a beacon with two SSIDs, one for guests and one for the subscriber, and how the traffic associated with each SSID can be assigned differing priorities.

The United States Patent Application having the publication number US2006/0117104 entitled "Setting Information Distribution Apparatus, Method, Program, and Medium, Authentication Setting Transfer Apparatus, Method, Program, and Medium, and Setting information Reception Program" describes how a SAML message is used to tell a security device what a client device's current source address is.

The United States Patent Application having the publication number US2009/0129386 entitled "Operator Shop Selection" describes how an access node for an Ethernet network is connected between an access point for user devices and a Broadband Remote Access Server (BRAS) for access to a plurality of service providing networks which includes a Virtual Local Area Network (VLAN) handling unit. This patent application describes a number of schemes for enabling a user to access one of a range of possible broadband services by using extended network address indicators. Various schemes for acquiring IP addresses are described, however, whilst NAT is recognised as a problem in US2009/0129386, the situations contemplated are different in that the public IP address of traffic to be authorised for using the each service provided by an operator is the address which is first allocated, and the invention considers how this address space can be reused if NAT occurs between the allocation point and the client device.

Embodiments of the invention generally seek to obviate or mitigate limitations associated with the use of known systems, particularly those which require authentication in the broadband access service provider's domain, by providing a system for authorising roaming device generated traffic for onwards transmission in a communications system which deals with NAT in a different manner. The system is arranged to enable an authorisation server to remotely learn if traffic which has undergone NAT translation is associated with a device previously authenticated as one authorised to use the roaming service. The server receives messages and, if the message is recognised as a special meta-data type of message which requires the source address field to be examined, the IP address found in the source address (SA) field of the message can be associated with a device identifiable using the meta-data carried in the message payload. This message is generated by the access point used by the device so that the IP SA of the message from the access point undergoes the same NAT translation as that of the IP SA of packets genuinely generated by the authenticated device. In this way, a service selection gateway can be configured to automatically forward traffic received from the roaming device when this is subsequently generated which is received with the recognised IP address without referral to the authentication system or to the NAT server.

SUMMARY STATEMENTS OF INVENTION

The aspects and preferred embodiments of the invention are as set out below and in the accompanying claims, which may be combined in any appropriate manner apparent to one of ordinary skill in the art.

One aspect of the invention seeks to provide a method of determining a network address translated IP address for traffic generated by a device authorised to use a roaming service providing access via a wireless local area network to a communications system, the communications system being arranged to support traffic originating from a plurality of roaming devices using a plurality of wireless local area networks, each wireless local area network being provided by a wireless access point, wherein a said wireless access point comprises means arranged to: receive a request for authorisation from a device which has associated with a wireless network provided by the wireless access point; process the request to generate an authorisation request for the device to use the roaming service; and forward the request to an authentication server, wherein the server is arranged to respond to a request presenting valid authentication credentials for a device to authorise the device to use the roaming service and to respond to the access point that the device has been authorised, wherein the method comprises: allocating a private IP address for the authenticated device, the wireless access point generating a message including meta-data identifying the authenticated device and including in a source address field of the message an IP address allocated to the authenticated device; and forwarding the meta-data message to a remote server, wherein, when said remote server receives said message, the message received has undergone network address translation of its source address, and wherein the remote server comprises means arranged to associate said translated IP source address of said meta-data message with an authenticated device identified by said meta-data, whereby subsequently traffic generated by said identified authenticated device and having said translated source IP address is authorised to use said roaming service in said communications system.

The remote server may comprise said authentication server. The remote server may comprise a proxy for said authentication server. The proxy server may comprise means arranged to link a received meta-data message identifying a device with a data-record comprising data identifying the same device and indicating the device is authenticated and authorised to use said roaming server.

The above method aspect of the invention seeks to relate to a network architecture in which authentication occurs before a private IP address is allocated to a client device roaming in a WLAN (roaming in the sense that the device associates with a wireless network having an SSID for which it is not automatically pre-authenticated). The IP address is private in that it is the IP address uses within the WLAN which is visible to the access point. The invention seeks to enable an authentication server to operate in an network architecture in which it retains awareness after authenticating a device based on user and/or device credentials (which may be automatically presented when the device associates with a WLAN AP responsive to receiving a beacon from the WLAN AP) of any IP address subsequently allocated to the roaming device and any mapping between the allocated IP address and an IP address resulting from any NAT translation of the allocated IP address. In this way, an IP address can be allocated to the device using any appropriate method known to persons of ordinary skill in the art, such as, for example, an IP address may be locally allocated by the access point with which the authenticated device is associated, or the IP address may be allocated remotely by using a dynamic host configuration protocol (DHCP) via a DHCP server or by using relay DHCP. The allocated IP address may be stored in association with the translated version of the allocated IP address, which enables the mapping between the allocated and translated version of IP addresses to be known by the authentication server.

The invention seeks to enable a NAT translated IP address to be determinable by an authentication server examining the source address of a special "meta-data" carrying message (or equivalently a "special" packet) which is generated by the access point. The message (or equivalently packet) received from the access point has both its contents (payload) and source address examined. The contents identify the client device and may include the original form of IP address allocated (if not already reported, for example, from a DHCP server and stored in association with an identifier for the client device). The source address of the message the access point has generated enables the authentication server to learn the NAT mapping imposed on the allocated IP address. The invention thus ensures that there is no need for a NAT server to report each NAT translation it performs on each packet to the authentication server in order for the packet to be authenticated for onwards transmission by the authentication server. In this way, the invention has the potential to reduce the amount of signalling overhead in the access and core networks which may help to improve the scalability of the authentication system, enabling more client devices to be authenticated by an authentication server.

The access point may allocate an IP address to the authenticated device responsive to receiving a request for access to the roaming service from the authenticated device.

The wireless access point may be arranged to inhibit the assignment of said allocated Internet Protocol address to a roaming device until roaming traffic with said private Internet Protocol address is authorised for said roaming service by the authentication server.

The message may have an eXtensible Meta-data Language (XML) message data format.

The meta-data of the message may identify the roaming device using a device identifier.

The device identifier may comprise a media access control (MAC) address for the device.

Another aspect of the invention seeks to provide a WLAN access point arranged to participate in the above method aspect, the access point comprising: means to receive traffic from a roaming device which has associated with a wireless communications network provided by the WLAN access point; means to enable the roaming device to seek authentication from an authentication server; means to allocate an IP address to said roaming device responsive to receiving a roaming service request from a device authorised to use a roaming service supported by the WLAN access point by said authentication server; wherein said access point is further configured to generate, in response to allocating said IP address to an authorised device, meta-data traffic addressed to said remote server, wherein the meta-data traffic enables the NAT translated IP address of traffic generated by the roaming device to be determined by said remote server examining the received IP source address of said meta-data traffic and by examining the payload of said received meta-data traffic to determine an identifier for the device.

If the remote server successfully associates said meta-data traffic with a said authorised roaming device using said identifier, subsequent traffic received with said NAT translated. IP source address from the device may be automatically authorised to use said roaming service.

Another aspect of the invention seeks to provide an authentication server arranged to participate in a method aspect, the authentication server being arranged to authorise communications traffic originating from a wireless access point to use a roaming service, the traffic comprising an NAT translated IP source address, the authentication server comprising: means to process a said request for authorisation received from a WLAN access point for a roaming device which has associated with the wireless network provided by said WLAN access point; means to process the received request to validate any credentials and to authorise a roaming device for which validated credentials are presented by the access point and to communicate a successful authorisation to the WLAN access point; means to process a meta-data message received from the WLAN access point which has undergone network address translation to extract from a source address field of the message an IP address; means to determine, from the information provided in said meta-data message when received at the authentication server the identity of the authenticated device, and to store said NAT translated source address of the meta-data message as the NAT translated source address of traffic from said authenticated device, whereby subsequently, traffic having said NAT translated IP source address is automatically authorised to use said roaming service to access said communications system.

Another aspect of the invention seeks to provide a remote server comprising: message processing means arranged to process a meta-data message received from a WLAN access point which has undergone network address translation, said message processing means comprising: means to extract from a source address field of the received message an IP address; means to determine, from information extracted from the payload of said meta-data message, a device identity; means to verify the device identity comprises a device identity of a previously authenticated device, means to store said IP address extracted from the source address field of said received meta-data message as a NAT translated IP source address for traffic from said authenticated device, whereby subsequent traffic generated by said device which undergoes the same network address translation is automatically authorised to use said roaming service to access said communications system.

The remote server may further comprise means to determine an IP address allocated to said authenticated device.

The remote server may comprise said authentication server according to any appropriate aspect.

Another aspect of the invention seeks to provide a communications system supporting device roaming within a plurality of wireless local area networks, each wireless local area network being provided by a wireless access point, the communications system including: a plurality of said wireless access points according to any appropriate aspect of the invention; at least one authentication server according to any appropriate aspect of the invention.

The communications system may further comprises a remote server according to any appropriate aspect of the invention.

Another aspect of the invention seeks to provide a communications system providing a roaming communications service for devices roaming within a plurality of wireless local area networks, each wireless local area network being provided by a wireless access point, the communications system including: a plurality of devices; a plurality of wireless access points; and at least one authentication server; wherein each wireless access point comprises: means to receive a request for authorisation from a device which has associated with a wireless network provided by the wireless access point; means to process the request to generate an authorisation request for the device to use the roaming service; and means to forward the request to an authentication server;

means to allocate an IP address to an authenticated device authorised to use said roaming communications service by said authentication server; means to generate a message including meta-data identifying the authenticated device and in a source address field, the IP address allocated to the authenticated device; means to forward the message over said communications system; wherein each authentication server comprises: means to receive authentication requests; means to process received authentication requests to authorise a device to use said roaming server if said request presents valid one or more authentication credentials; wherein the communications system further comprises: means to allocate an IP address to an authenticated device: means arranged to perform network address translation on the allocated IP address; means to receive a said message including meta-data from a said access point; means to process a received message to identify a device from meta-data provided by said received message. means to verify said device is an authenticated device authorised to use said roaming service; means to extract from a source address field of said received meta-data message, an IP address; means to store an extracted IP address as a source address for traffic authorised for onwards transmission; whereby traffic subsequently generated by the device with said IP address is automatically authenticated for onwards transmission in said communications network.

The extracted IP address comprises a network address translation of the IP address allocated to the device. The extracted IP address may be stored in association with the authenticated device identified by meta-data carried in the received meta-data message. The meta-data message may identify a device using an identifier such as a device identifier, a user identifier or the allocated IP address, if this has been previously stored as an allocated IP address for an authenticated device. The IP source address may be stored as an authenticated IP source address in a data structure to enable a look-up operation to be subsequently performed by a server in said communication system on traffic received from the authenticated device. Traffic which has undergone the same network address translation as the translated source address of said received meta-data message is thus capable of being automatically authorised to use said roaming service in said communications system. The invention enables a device to roam from WLAN to WLAN and maintain continuity of the roaming service for on-going data sessions.

An IP address may be allocated responsive to said roaming service generating a request to use the roaming service which a said access point receives.

The IP address of said meta-data message undergoes at least one level of NAT prior to said message being received by said authentication server.

Another aspect of the invention seeks to provide an authentication server arranged to authorise traffic having a network address translated IP source address to use a communications system, the traffic originating from a client device located in a wireless local area network arranged to provide a roaming access service to the communication system, the server comprising: means for receiving a communication generated by an access point providing said wireless local area network; means to extract from the received communication data comprising an identifier for a client device already authenticated by the server as authorised to access the communications system using said roaming access service; means to extract from a source address field of the communication an IP source address which has undergone network address translation; and means for storing in a data structure the translated IP address extracted from said communication generated by said access point as an IP address for traffic generated by said client device which is authorised to access said communications system.

Another aspect of the invention seeks to provide a method of authorising traffic having a network address translated IP source address to use a communications system, the traffic originating from a client device located in a wireless local area network arranged to provide a roaming access service to the communication system, the method comprising: receiving a communication generated by an access point providing said wireless local area network; extracting from the received communication data comprising an identifier for a client device already authenticated by an authentication server as authorised to access the communications system using said roaming access service; extracting from a source address field of the received communication an IP source address which has undergone network address translation; and storing in a data structure the translated IP address extracted from said communication generated by said access point as an IP address for traffic generated by said client device which is authorised to access said communications system.

Another aspect of the invention seeks to provide a method of authorising a roaming device to use a roaming service for a wireless local area network provided in a communications system, the communications system being arranged to support traffic originating from a plurality of roaming devices using a plurality of wireless local area networks, each wireless local area network being provided by a wireless access point, the method including a said wireless access point: receiving a request for authorisation from a device which has associated with a wireless network provided by the wireless access point; processing the request to generate an authorisation request for the device to use the roaming service; forwarding the request to an authentication server, wherein the server is arranged to respond to the presentation of valid authentication credentials to authenticate the device; wherein the method further includes a said wireless access point: receiving a request for a service address from an authenticated device, and responsive to said request allocating a service address for the authenticated device; processing the received request to generate a meta-data message including as the source address the allocated service address; forwarding the meta-data message to said authentication server, wherein said server receives a meta-data message with a translated source address and is arranged to associate said translated source address of said meta-data message with said authenticated device, whereby traffic having said translated source address is authorised to use said roaming service in said communications system, The meta-data message may be associated with said authenticated device by further including meta-data which identifies the device.

The allocated service address may be stored in a data structure already associated with an authenticated device, and the message may further comprise said authentication server: performing a look-up operation based on said allocated service address to verify it has been authenticated, and storing in said data structure the received network translated IP source address extracted from said meta-data message as a source address for subsequent traffic from said authenticated device.

The service address requested may comprise an Internet Protocol address.

The wireless access point may be arranged to inhibit the assignment of said allocated service address to a roaming device until roaming traffic with said translated service address is authorised for said roaming service by the authentication server.

The meta-data message may comprise an XML message.

In the above method aspect, said meta-data message may identify the roaming device using a device identifier.

The device identifier may comprise a media access control (MAC) address for the device. Another aspect of the invention seeks to provide a WLAN access point arranged to participate in the above method aspect, the access point comprising: means to receive traffic from a roaming device which has associated with a wireless communications network provided by the WLAN access point; means to allocate a service address to said roaming device responsive to receiving a request from a device authorised to use a roaming service supported by the WLAN access point by a remote server; means responsive to said authorisation server for assigning the allocated address to the roaming device; wherein said access point is configured to generate, in response to receiving a said service address request from an authorised device, meta-data traffic which enables the NAT translated address of traffic generated by the roaming device to be determined by said remote authorisation server, whereby if said authorisation server successfully associates said meta-data traffic with said authorised roaming device, said authorised roaming device is assigned said allocated service address and subsequent traffic with said NAT translated service address is automatically authorised to use said roaming service.

Another aspect of the invention seeks to provide an authentication server arranged to authorise communications traffic originating from a wireless access point to use a roaming service, the traffic comprising an NAT translated IP address, the server comprising: means to process a request for authorisation received from a WLAN access point for a roaming device which has associated with the wireless network provided by said WLAN access point; means to process the received request to authorise the roaming device and to communicate a successful authorisation to the roaming device via the WLAN access point; means to process a meta-data message received from the WLAN access point in which the source address of the message comprises the source address of the roaming device at the WLAN access point; means to determine, from the information provided in said meta-data message when received at the authentication server, said information including a NAT translated source address of the meta-data message, the NAT translated source address of traffic from said authenticated roaming device, whereby internet-bound traffic having said NAT translated source address is automatically authorised to use said roaming service.

Another aspect of the invention seeks to provide a communications system supporting device roaming within a plurality of wireless local area networks, each wireless local area network being provided by a wireless access point, the communications system including: a plurality of said wireless access points, each comprising: means to receive a request for authorisation from a device which has associated with a wireless network provided by the wireless access point; means to process the request to generate an authorisation request for the device to use the roaming service; and means to forward the request to an authentication server; an authentication server arranged to respond to the authentication credentials presented to authenticate the device,
  wherein a said wireless access point further comprises:
    means to receive a request for a service address from an authenticated device, and responsive to said request allocating a service address for the authenticated device; means to process the received request to generate a meta-data message including as the source address the allocated service address; means to forward the meta-data message to said authentication server, wherein said authentication server further comprises: means to receive a meta-data message with a translated source address; means to associate said translated source address of said meta-data message with said authenticated device, whereby said authentication server authenticates traffic having said translated source address as authorised to use said roaming service in said communications system.

According to the invention, a secure tunnel is established for users roaming in a particular wireless local area network which separates roaming traffic from non-roaming traffic which the subscribers providing a particular wireless access point for that local area network may generate. This ensures that when traffic is monitored, it is relatively easy to establish from the network SSID if the traffic originates from a user who is roaming within that network or not. However, if an authentication server is located in a region of the network by which point received roaming traffic will have undergone NAT translation of its IP source address, it is necessary to determine whether the device from which the traffic originates has been authenticated to use the roaming service or not. This means that the IP source address of received roaming traffic needs to be associated with the outcome of the earlier authentication process. The invention seeks to provides a method of and system for traffic having a NAT translated IP source address to be forwarded on towards its destination only if the traffic originates from a roaming device already authorised to use the roaming service.

BRIEF DESCRIPTION OF THE DRAWINGS

Embodiments of the invention will now be described with reference to the accompanying drawings which are by way of example only and in which.

DETAILED DESCRIPTION OF PRESENT EXAMPLE EMBODIMENTS

The best mode of the invention will now be described with reference to the accompanying drawings. In the following description of the preferred embodiments of the invention, those of ordinary skill in the art will be aware of modifications and functional equivalents to those features of the invention which are described herein below and that certain features of the invention may be omitted from the description for the sake of brevity and clarity where their inclusion and function as part of the invention is apparent and known to those of ordinary skill in the art.

Figure 1A:
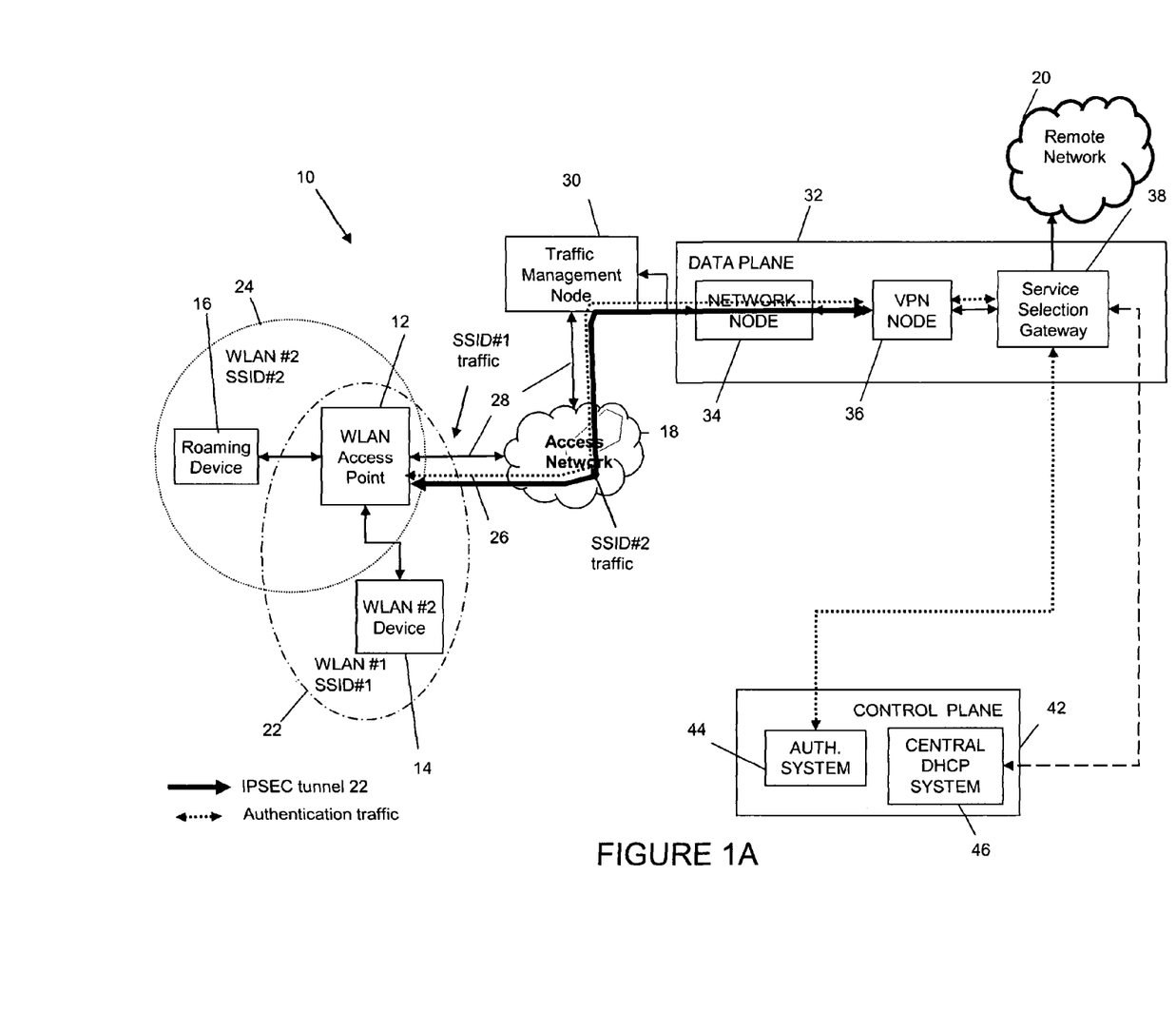
FIG. 1A shows traffic flows associated with authenticating a roaming device in a communications system according to an embodiment of the invention.
Figure 1B:
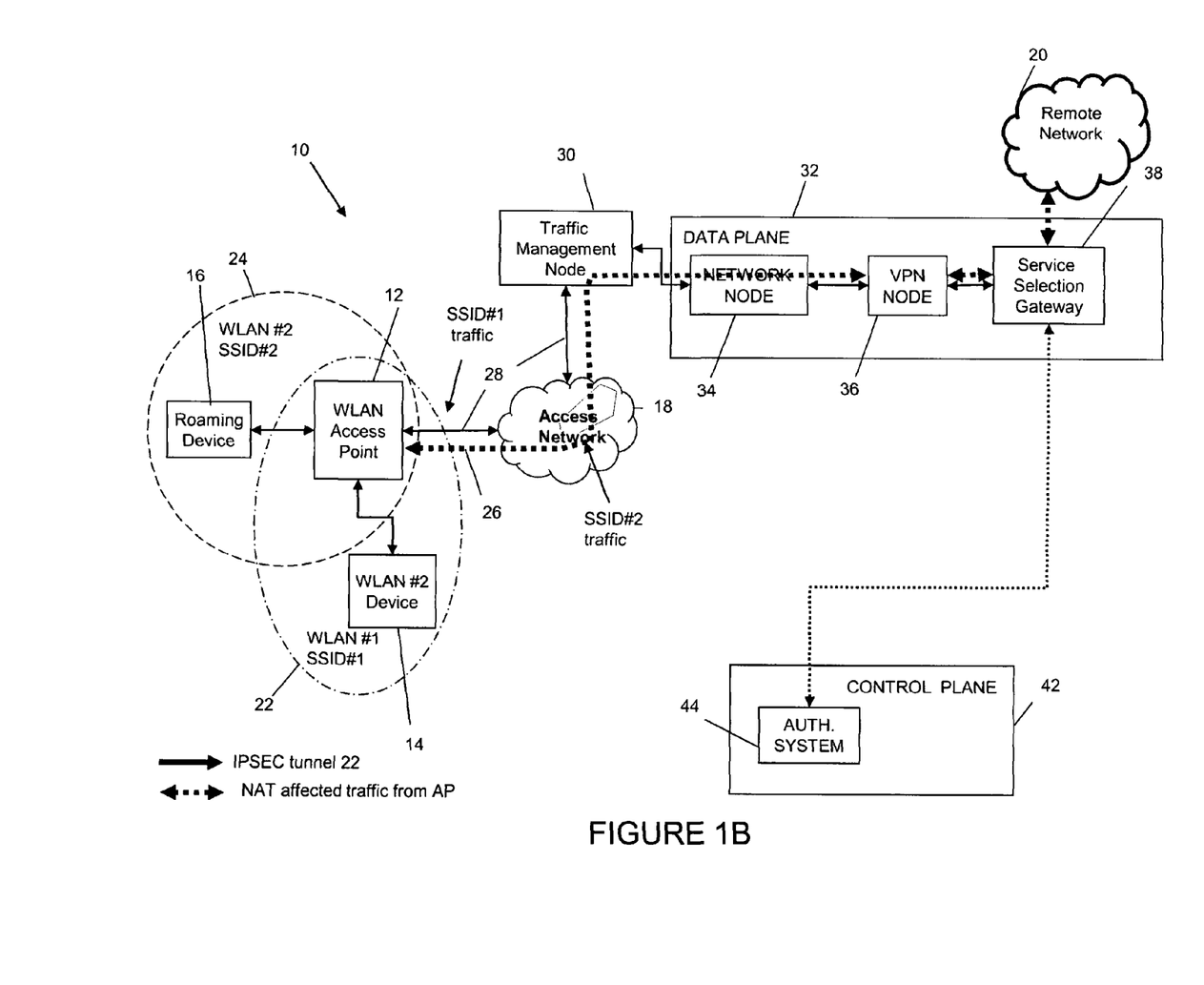
FIG. 1B shows how traffic flowing from access point 12 is used in a method of determining a NAT translated IP address of traffic from an authenticated roaming device in the communications system of FIG. 1A according to an embodiment of the invention.
Figure 1C:
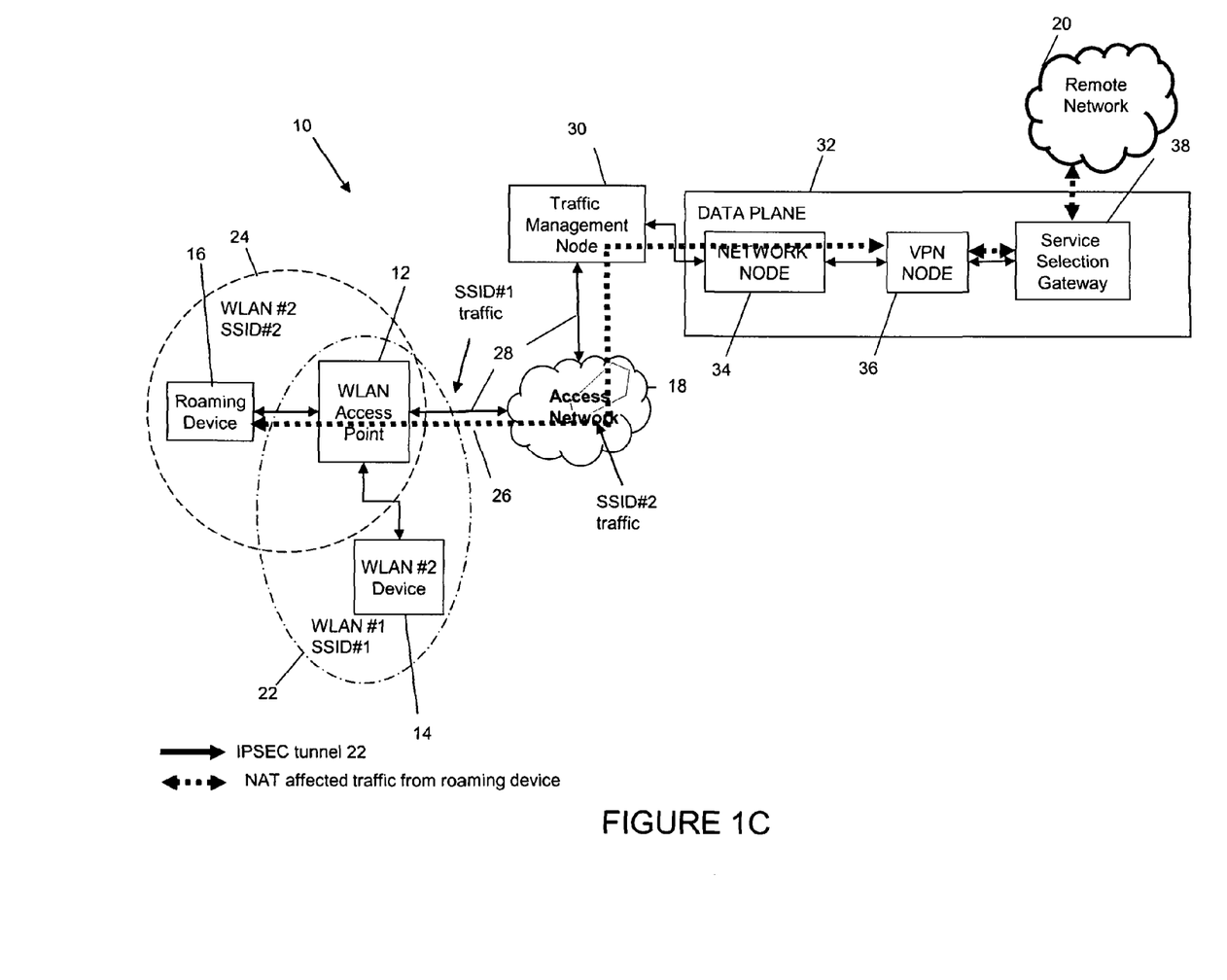
FIG. 1C shows how the traffic flowing from the authenticated roaming device undergoes NAT translation in the communications system of FIGS. 1A and 1B according to an embodiment of the invention.

FIGS. 1A, 1B and 1C of the accompanying drawings all use like numbering to describe the same elements. FIGS. 1A,1B and 1C show a communications system 10 which comprises a plurality of wireless local area network (WLAN) access points (APs) 12, of which just one is shown, which provide one or more communications-enabled devices 14, 16 with connectivity over access network 18 to the internet 20. WLAN AP 12 supports traffic separation by having the capability of assigning a device 14, 16 to one of at least two network service set identifiers (SSIDs). As shown in the exemplary scenario of FIG. 1, WLAN AP 12 enables a user who has subscribed to an internet service provider to access the internet 20 using the WLAN AP 12 via one of two WLANs 22, 24, depending on whether their device 14 associates with a first network 22 (SSID #1), which may be reserved for non-roaming traffic, or with a second network 24 (SSID#2), which is reserved for one or more roaming devices, of which just one is shown for clarity in FIG. 1, roaming device 16.

The WLANs (22, 24) are configured to provide a suitable short to medium range wireless communications network, depending on the technology used and their antenna power and local environment. For example, a WLAN which conforms to one or more of the IEEE 802.11 suite of wireless communications protocols, including the Wi-Fi and Wi-Max (802.16) high-bandwidth communications protocols, or any other suitable communications protocol, for example, a short-range radio-frequency communications protocol such as Bluetooth™.

A device (14, 16) may comprise any suitable mobile communications-enabled device, including but not limited to: portable computers, cellular communications telephone handsets, tablet devices, games consoles, audio and or video content players and/or recording devices and/or any other suitable electronic hand-held or otherwise portable devices for which wireless connectivity is enabled. A roaming device is any device which associates and is capable of accessing communications system 10 (for example, to connect to the Internet 20) using the connectivity provided by the "guest" network 24 with the SSID#2.

The term "access point" is used hereinto to refer to a device providing access to broadband communication services over an access network between the broadband service subscriber's premises where the access point is located and the local exchange (or equivalent), for example, access to a Digital Subscriber Line (DSL) type of communications service. The access point may be provided as a single integrated unit with router functionality or it may be deployed in use with a router functionality to enable a plurality of devices to connect via the WLAN it provides to the broadband access service contemporaneously.

A request to access the Internet 20 is generated directly when a user of a device 14, 16 launches a world-wide-web internet browsing application or launches any other application which requires data to be provided from a remote server accessible via the internet 20. Such requests comprise Internet bound traffic and usually require the user of a roaming device 16 to be authenticated to use the service offered by the internet service provider associated with the wireless access point 12, which may not be the service provider with whom the user of device 16 has established a service account. Under such circumstances, the user of a roaming device 16 must be somehow authenticated to use a roaming service when the roaming device 16 generates a request to access Internet 20 outside the service area for which the user's own internet service provider account has authorized their use (referred to herein as a "home" WLAN). A home WLAN, for example, WLAN 22 with the SSID#1, comprises an area of network coverage provided by a wireless network access point 12 for which a user has configured devices 14 to be automatically authenticated to allow use of that user's service account details with an internet service provider. Outside the area of a home WLAN 22, the user's devices need to use an alternative network 24 providing some form of connectivity to access the Internet (20), for example, as shown in FIG. 1, if they use an alternative WLAN 24 they must use a form of roaming service providing access over access network 18.

Many systems are known in the art which enable a user to obtain access to the Internet 20 whilst their device 16 is roaming. One system as shown in FIGS. 1A,B,C enables a user to access the Internet using a roaming device providing that they have subscribed to an Internet Service provider which enables other devices to roam whilst in the area of wireless network coverage provided by their own access point. If a subscriber has configured their own wireless access point 12 to provide a roaming service (i.e., a guest or visitor WLAN 24) to visiting devices 16, that subscriber is permitted to use one or more devices as roaming devices 16 in other subscriber's guest networks 24 when the device is outside the area of network coverage provided by the subscriber's own "home" network 22.

In the embodiment of the invention shown in FIG. 1A, a roaming service is provided by a roaming device 16 detecting a network beacon from a WLAN access point (AP) 12 and associating with that WLAN AP's guest network 24. The device 16 will immediately be challenged to identify itself so it can be authenticated as a device authorized to use the roaming service by the WLAN AP 12, and generates an authentication request at this point. The WLAN AP 12 separates the authentication traffic associated with devices using guest WLAN 24 by sending the authentication request on a separate, usually secure, communications link 26 over the access network 18 to a suitable check-point, for example, a check-point which verifies one or more device credentials to identify a user of the device as a roaming service subscriber. In the example shown in FIG. 1A, the check-point is implemented, via a service selection gateway (SSG) 38, using an authentication system 44 accessed via the control plane 42.

At the check-point, the authentication request is processed and the device 16 is only authenticated as a device that has been granted access to use the access network for subsequent communication service requests if the authentication credential(s) presented in the authentication request is (are) correct.

At some point after authentication. an IP address is allocated to the device. In the best mode of the invention currently contemplated by the inventor's a private IP address is allocated by the AP 12. The AP 12 either determines what IP address is to be allocated itself or the IP address may be assigned using a different mechanism and then allocated by the AP 12. Another mechanism may be used to make the AP 12 aware of what private IP address has been assigned to the device 160. For example, it is possible for the private IP address to be assigned via a DHCP server 46 or for relay DHCP to be used to assign a private IP address (shown in FIG. 1A by the long dashed line from the DHCP server 46 to the service selection gateway (SSG) 38, providing the assigned address is passed to the Ap 12 for allocation. This is not the currently preferred best mode of the invention contemplated by the inventors. Moreover, such a use of the DHCP server would be implemented differently from when a DHCP allocation scheme is used to assign a "public" IP address which would correspond directly to the source address in traffic from the device 16 when received by the SSG 38. If a "public"IP address is assigned for use after any NAT, by the DHCP server, then the assigned "public" address can be used directly to identify traffic from devices authenticated for using the roaming service.

The use of DHCP to allocate a public IP address is not described in more detail herein as this process is well known to those of ordinary skill in the art. The embodiments of the invention seek to enable the control plane 42 to have understanding of what NAT address translation has undergone by traffic received by the SSG 38 so that traffic with the NAT translated address can be authenticated directly. This is achieved, as FIG. 1B shows, by the AP 12 generating a metadata message in which the source address field does not contain the IP address of the AP 12, but instead, contains the private IP address allocated to the roaming device 16. Accordingly, as long as the AP 12 is made aware of the private IP address allocated to the roaming device 16, the invention can be implemented regardless of whether the actual private address assigned is one which the AP 12 has determined should be allocated to the device 16 or which a DHCP server has somehow allocated as a private IP address for use by the device 16.

In one embodiment, the IP address is either allocated after the AP 12 has received acknowledgement from the authentication server 44 that the device 16 was successfully authenticated to use the roaming service granting access to access network 18. In another embodiment, an IP address is allocated after an IP address is requested by the device 16. The IP address is assumed to be allocated by and assigned to the device 16 by the WLAN AP 12 in the embodiments described later herein below shown in FIGS. 2A and 2B. In some embodiments of the invention, an IP address is allocated before but not assigned until after the NAT version of the IP address which would be received by the SSG 38 is known by the SSG 38 to be associated with traffic from a device authenticated as one authorised to use the roaming service. Alternatively, however, the IP address allocated may be automatically assigned to the device 16 after allocation or after a predetermined amount of time.

Referring briefly now to FIG. 1C, when an authenticated device 16 attempts to generate traffic for onwards transmission over communications system 10, such as service request related traffic requiring access to Internet 20, the WLAN AP 12 separates the roaming traffic received over the guest WLAN 24 by also sending it on the separate, usually secure, communications link 26 over the access network 18 to a suitable check-point (in practice this is likely to be the same "check-point" 38 as is used for authentication, although a different remote server in the control plane could be used instead as a proxy for the authentication system 44. At the check-point the traffic is examined to determine if it has a source address which is associated with a roaming device 16 for which use of the roaming service has been authorized (which is based on the information captured when the device 16 first authenticated with the WLAN AP 12).

A communications system in which a method of determining a network address translated IP address for traffic generated by a device authorized to use a roaming service according to an embodiment of the invention will now briefly be described in more detail. Such a communications system comprises a plurality of APs 12, in practice, for example, hundreds to thousands to tens of thousands to even hundreds of thousands and more APs. Each AP is configured to providing roaming and subscriber devices with WLAN access to broadband services via access network 18, for example, to enable devices to access session-based services from other networks (20) such as web-based services accessed using the Internet 20. FIGS. 1A,B,C also show just one WLAN AP 12 for clarity, which provides two communications links 26, 28 over access network 18 to Internet 20. As mentioned above, non-roaming traffic is sent over a first communications link 28 via a traffic management node 30 where it is forwarded directly to the internet 20. Roaming traffic is sent over a separate secure communications link 26 which also passes through intermediate nodes 30, 34 to a secure communications link terminal point, for example, a virtual private network (VPN) node 36. An example of a suitable secure communications link comprises an Internet Protocol Secure (IPSEC) tunnel between the WLAN AP 12 and the VPN node 36.

As shown in FIGS. 1A,B,C, VPN 36 is configured to forward received traffic to a service selection gateway (SSG) 38. The SSG 38 determines which roaming service is associated with the received traffic generated by the roaming device 16 and routes the roaming traffic accordingly. As shown in FIG. 1B, SSG 38 forwards roaming traffic on to a control plane 42 where the authentication conducted at the WLAN AP by the roaming device 16 is checked using a suitable authentication server system 44 to ensure that only traffic generated by devices which have been already authenticated as devices authorized to use a roaming service is transmitted onwards.

Figure 2A:
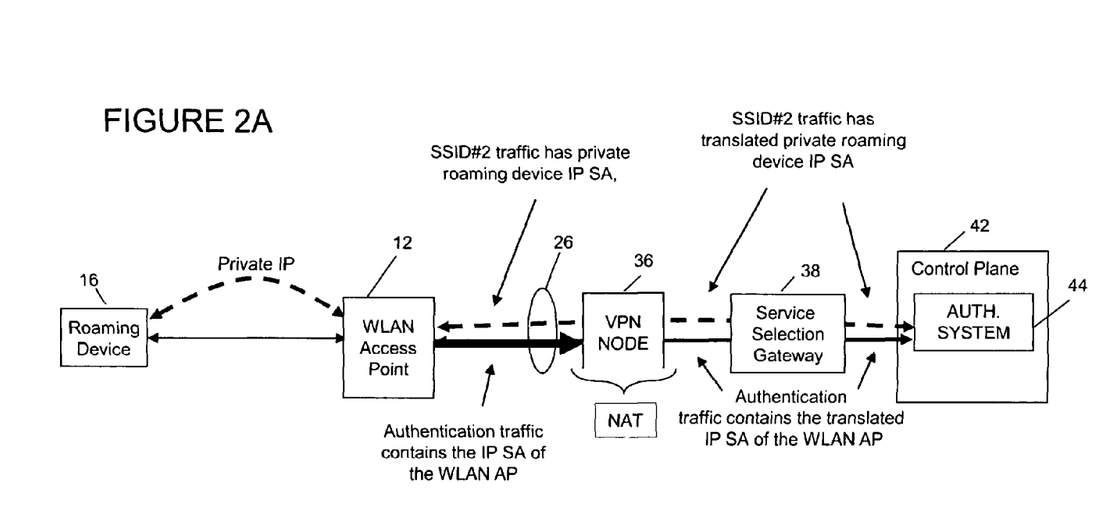
FIG. 2A shows schematically how roaming traffic is authorised to access the internet in the communications system shown in FIG. 1 according to an embodiment of the invention by first authenticating roaming device 16.
Figure 2B:
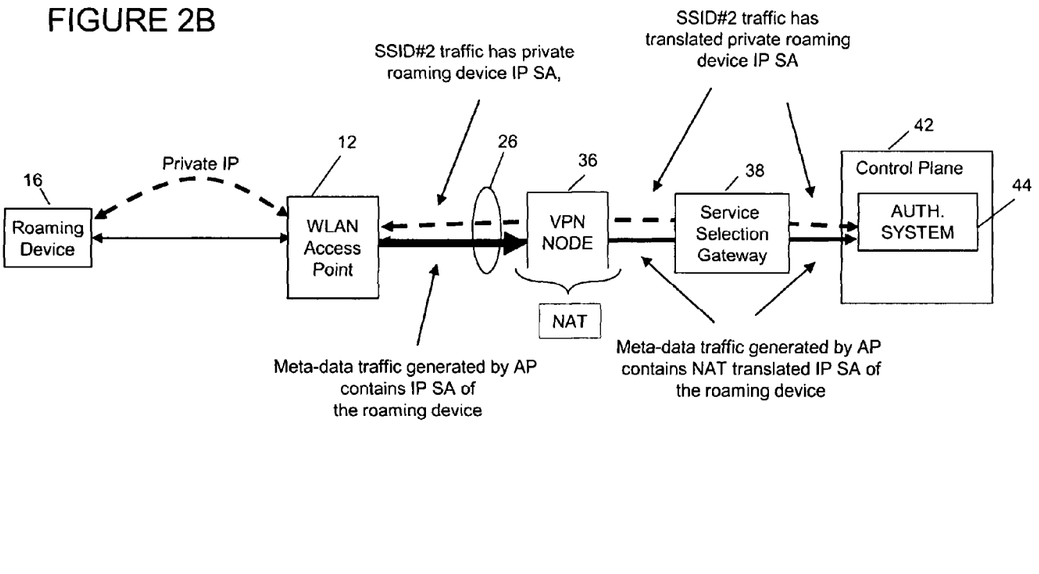
FIG. 2B shows schematically how roaming traffic is authorised to access the internet in the communications system shown in FIG. 1 according to an embodiment of the invention by secondly associating the NAT translated version of an IP address allocated to the roaming device with the authenticated roaming device 16.

FIGS. 1B, 2A and 2B show the role of the AP 12 in enabling the SSG 38 and control plane 42 to determine that received traffic from roaming devices has been authenticated for onwards transmission to other network(s) 20.

FIG. 2A shows a mechanism for associating authentication information for a user of a roaming device 16 with a private IP address assigned locally to the roaming device 16 by the WLAN AP 12 according to an embodiment of the invention. In FIG. 2A, the WLAN AP 12 allocates a private IP address to a roaming device 16 from a range of possible addresses allocated to the WLAN AP. A roaming device 16 is not allocated an IP address until after the device 16 has been authenticated by authentication server 44, however, once an IP address has been assigned to an authenticated device by the AP 12, the IP address seen by the SSG 38 needs to be associated with a device previously authorized by authentication server 44 to use the roaming service.

In FIG. 2A, the authentication traffic generated by the AP 12 has as its SA, the IP address of the WLAN AP 12.

According to the embodiments of the invention, in order for the traffic generated by the device to be forwarded on by the SSG 38 to other networks, a remote server, for example, authentication server 44 must know the NAT translated IP address allocated to a device which has been authenticated. In this way, only IP traffic from an authenticated device is allowed to access internet 20.

Each WLAN AP 12 in the communications system is configured to generate a separate authentication message, for example an eXtensible Meta-Language (XML) message which is also forwarded over the same secure tunnel as the traffic from roaming devices. As is shown in FIG. 2B, the XML data contains sufficient information to identify the roaming device 16 directly from a device identifier which enables the authentication server 44 to extract from the source address of the received meta-data message the IP address and make the necessary association of this address with the NAT translated IP address of the traffic to be subsequently received from the roaming device 16. If the meta-data includes details of private IP address allocated by the WLAN AP to that particular roaming device 16, this is also stored. Alternatively, or additionally other device or user identification data may be used depending on the data stored when the roaming device was authenticated, for example, meta-data may include the Media Access Control (MAC) address, the WLAN AP MAC and/or IP addresses, and/or any other relevant information capable of identifying the roaming device 16 as a device authenticated for using the roaming service.

NAT translation may be provided at more than one location between the WLAN AP 12 and the SSG 38 and authentication server 44 depending on the amount of IP address space reuse of a particular network architecture. The authentication traffic (which has as its source address the IP address for the WLAN AP 12) is assumed to have undergone at least one level of NAT translation prior to reaching authentication server 44. It is possible, in one embodiment, for this authentication to traffic itself contains the privately assigned IP address of the roaming device 16 if allocation happens prior to the authentication, but in most embodiments authentication will precede the allocation of the IP address.

If the traffic has undergone NAT one or more times, any traffic which is generated by an authenticated device in this embodiment will have a different, NAT translated IP address, from that allocated by the WLAN 14 by the time it reaches the SSG 38. Accordingly, it is necessary for the SSG 38 (and accordingly the authentication server 44) to know what the NAT translated IP address is of an authenticated device if the internet traffic this device generates is to be authorized on the basis of its source IP address to proceed on to the internet 20.

As shown in FIG. 2B, a meta-data message is generated by the WLAN AP 12 to enable the authentication server 44 to determine the translated IP SA of a roaming device 16. The WLAN AP 12 is configured to generate a meta-data carrying message (or equivalently, packet) which contains in the SA field the private IP SA allocated by the WLAN AP 12 to the roaming device 16. This meta-data carrying message is sent to the authentication server 44 over the same secure communications link 26 as the authentication traffic and so undergoes the same NAT traversal as the authentication traffic. By replacing its own IP source address with the IP source address allocated to the roaming device in a message which includes a device identifier (for example, the MAC address of the roaming device 16), the authentication server 44 can associate the received message with an authenticated device 16 and map to that authenticated roaming device's record the NAT translated IP address provided by the meta-data message. In this way, subsequent traffic generated directly by the roaming device 16 (such as FIG. 1C shows) and which has as a source address the roaming device's NAT translated IP address by the time it reaches the SSG 38 is authorized to access the internet 20, and the SSG 38 can forward it appropriately. Accordingly, as is shown in FIG. 1C, the SSG 38 is configured to henceforth automatically forward all subsequently received packets which have the authorized NAT translated IP address in their SA fields on toward their destination without querying the control plane 42 for authorization.

Figure 3:
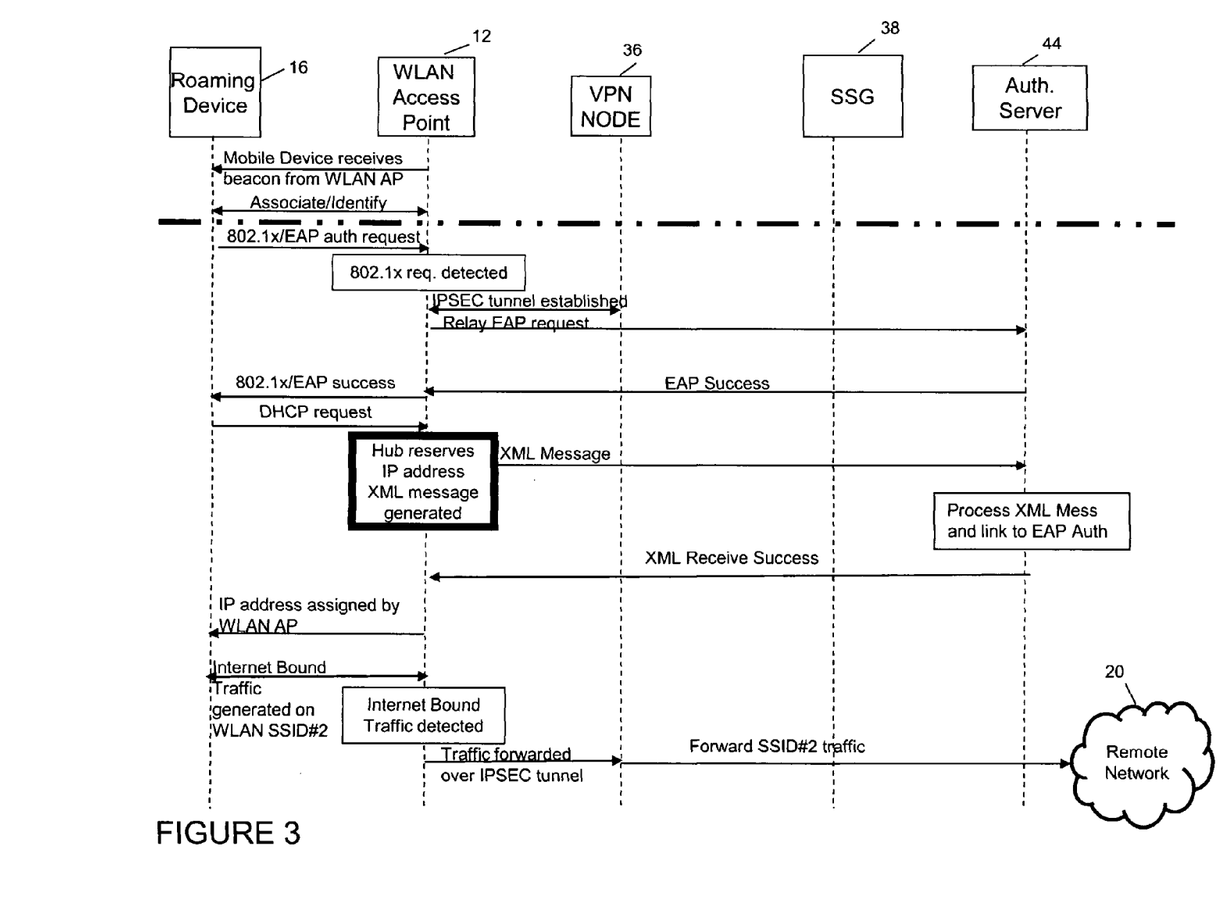
FIG. 3 shows some of the traffic which may be generated to implement an embodiment of the invention in accordance with FIGS. 2A and 2B.

FIG. 3 shows an exemplary message flow which may be sent in order for a roaming device 16 to be authenticated using the 802.1x authentication process. The message flow shown in FIG. 3 may omit messages known in the art as essential but which are not relevant in the context of the embodiments shown.

In the embodiment of the invention shown in FIG. 3 a roaming device authenticates using the IEEE 802.1x communications protocol for port-based network access control (PNAC) It provides an authentication mechanism for a device to attach to a WLAN to provide a point-to-point connection only if authentication is successful. IEEE 802.1x uses the Extensible Authentication Protocol (EAP) over LANs (EAPOL) for IEEE 802 LAN technologies such as the 802.11 wireless communications suite. A port in the 802.1x communications protocol refers to a single point of attachment to the WLAN infrastructure such as a particular roaming device 16. The WLAN AP 12 authenticates a roaming device 16 using a remote authentication server 44 such as a host platform arranged to support the EAP and RADIUS (Roaming Authentication Dial In User Service) which provides a centralized authentication, authorization, and accounting management. EAP authentication is well known in the art and is not described further herein.

In the embodiment of the invention shown schematically in FIG. 3, the use of the 802.1x protocol for roaming device authentication enables onwards bound (e.g. internet-bound) traffic generated by a roaming device 16 to be authenticated without re-directing all traffic to an authentication server 44 and/or requesting authentication information using a login-page. Instead, traffic is authorized if it is determined by the SSG 38 to originate from an authorized NAT translated IP address. This requires a special configuration of the WLAN AP 12 to enable additional information to be determined at the authorization server 44 than is provided in the 802.1x authentication traffic sent over the IPSEC tunnel established by the WLAN AP 12 with VPN node 36. Instead, the WLAN AP 12 generates a message containing meta-data, for example, an XML message. This meta-data is generated when the WLAN AP 12 receives an address request from a roaming device 16, for example, a DHCP IP address request.

In FIG. 3, roaming device 16 detects a beacon from WLAN AP 12 and having associated with the WLAN 24 the WLAN AP 12 immediately challenges the device 16 to identify itself, in response to which the device 16 sends its identity and an EAP authentication request to the WLAN AP 12. When the WLAN AP 12 detects it has received an EAP request, it establishes an IPSEC tunnel 26 to VPN node 36 via which the EAP request is relayed to a suitable authentication server system 44. As the EAP request is relayed from the WLAN AP to the remote authentication server its source address undergoes NAT translation. This means that the authentication system cannot authenticate IP traffic based on just the source IP address as the authentication system has only a NAT translated WLAN AP IP SA address. If the EAP request is successful, the roaming device 12 is authorized to use the WLAN 24 to send a local DHCP request to the WLAN AP 12.

The WLAN AP 12 then allocates an IP address for the roaming device 16 and generates a meta-data message in which its own address is replaced as the source address with the IP address it has allocated for the roaming device 16. This message contains other device identifying information and enables the authorization server 44 to associate the NAT translated address of the message it receives from the WLAN AP 12 with the authentication information. This enables the communications system 10 to be configured to allow internet traffic from roaming device 16 to access the internet 20 based on the NAT translated source IP address of the roaming device.

Once the authentication server 44 has linked the NAT traversed IP address allocated by the WLAN AP 12 to the roaming device 16, it indicates to the WLAN AP12 that the roaming device using that IP is authenticated to use the communications system 10 to access internet 20. WLAN AP 12 then releases the allocated IP address to the roaming device 12. Additional authentication may be performed at this point and/or the roaming device 16 is in one embodiment automatically enabled to access the internet 20 without any prompts being generated for user input. Where the roaming device 16 is automatically authorized and authenticated for internet access using this type of EAP and XML based authentication an advantage is that the user is not requested to enter any additional account or authentication information when an application launched on the device generates a service request requiring internet connectivity (i.e., there is no requirement to halt access to the internet whilst such authentication information is provided).

Thus a system and method for authenticating traffic generated by a roaming device in a wireless local area network and related aspects may be provided by embodiments of the invention which enable the NAT translated version of a private IP address known to be allocated to an authenticated device to be recognised by a service selection gateway (SSG) 38. An authentication server 44 is arranged to authorise communications traffic originating from a wireless access point to use a roaming service, the traffic comprising an NAT translated IP address. The server 44 first authorises a WLAN roaming device 16, and then processes a meta-data message generated by a WLAN access point 12 in which the source address of the message comprises the private IP source address of the roaming device (i.e. IP address at the WLAN access point) instead of the IP address of the WLAN access point itself. The server 44 then determines, from the information provided in the source address field of the meta-data message when it is received by the authentication server, which includes at this point a NAT translated IP source address, what the NAT translated IP source address of traffic from said authenticated roaming device will be, and from the message body extracts meta-data enabling this NAT translated IP source address to be associated with a device previous authenticated as authorised to use the roaming service. This enables the authentication server to authenticate internet-bound traffic having said NAT translated source address and enables the SSG 38 to be configured to forward all traffic generated by the roaming device whilst that NAT translated IP address is valid as the traffic is automatically authorised to use the roaming service for onwards transmission to other networks 20 such as the Internet.

A method of determining a network address translated (NAT) IP address for traffic generated by a roaming device authorised to use a roaming service for a wireless local area network provided in a communications system will now be described. As mentioned hereinabove, the communications system 10 is arranged to support traffic originating from a plurality of roaming devices 16 using a plurality of wireless local area networks 24, each wireless local area network 24 being provided by a wireless access point 12. The method comprises a said wireless access point 12 performing the steps of: receiving a request for authorisation from a device which has associated with a wireless network provided by the wireless access point; processing the request to generate an authorisation request for the device to use the roaming service which includes an identifier for the device; and forwarding the request to an authentication server 44. The authentication server 44 is arranged to respond to valid authentication credentials presented in said authorisation request for authenticating the device by sending an authentication response to the access point 12 which indicates the authentication credentials are valid and by updating a data record for the device to indicate that the identifier for the device is associated with a device authorised to use the roaming service. The wireless access point then processes the response from the server which indicates the device is an authenticated device and responsive to this allocates a private Internet Protocol address to the authenticated device. The access point 12 then generates a meta-data message which includes the identifier for the device 16 as meta-data and which also includes in a source address field the allocated Internet Protocol address of the authenticated device 16. The true source of the meta-data message is the access point 12, and so it is the IP address of the access point which would normally be identified as the source of such a message, but the access point is arranged to provide instead, in a source address field, the allocated Internet Protocol address of the authenticated device 16. The access point 12 then forwards the meta-data message to the authentication server. When the authentication server 44 receives a meta-data message with an Internet Protocol source address from said wireless access point 12, the address will have been subject to Network Address Translation. The authentication server 44 is arranged to:
determine the Internet Protocol source address of the meta-data message; and
store the Internet Protocol source address of said meta-data message in a data structure as a translated Internet Protocol source address for said authenticated device. The authentication server 44 then notifies service selection gateway SSG 38 that traffic having said translated Internet Protocol source address is authorised to use said roaming service in said communications system 10.

The invention may be implemented by configuring various components of the communications system shown in the accompanying figures to implement the various system components and method steps using one or more computer platforms running one or more computer programs.

In one embodiment, for example, the communications system 10 which is providing a roaming communications service for devices (16) roaming within a plurality of wireless local area networks (24), where each wireless local area network is provided by a wireless access point (12) must include at least one authentication server, although a system comprising a plurality of authentication servers and optionally proxy servers may be provided in some suitable configuration. Each wireless access point (12) in the system comprises suitable receiver means arranged to receive communications; for example, any requests for authorisation received from roaming devices which have associated with the wireless network (24) they provide. The wireless access point must also comprise data processing means arranged to process received communications such as the authorisation/authentication requests, in order to generate an authorisation request for the device to use the roaming service. The request needs to include suitable data identifying the roaming device 16 and credentials such as a username or device identity and optionally a password or other authenticable information to verify the device is associated with a roaming service account. The WLAN AP 12 also comprises means to support the WLAN, for example, an antenna to support transmission and reception of wireless signals and a suitable interface for transmitting data over access network 18 to the authentication server 44 which provides data transmission means to forward data communications, including signalling traffic such as, for example, the authentication/authorisation request to the authentication server 44 and any messages over said communications system to the control plane 42.

In addition, AP 12 comprises suitable means to allocate an IP address to an authenticated device 16 after it has been authorised to use the roaming communications service, which may be triggered by a response being received by the AP 12 form the authentication server 44. The AP 12 also comprises a suitable data processor arranged to generate a message including meta-data identifying the authenticated device (16) either in payload or in a header field and to provided in a source address field of the message (for example, a data packet to datagram), an IP address which has been allocated to the authenticated device (16). The IP address is a private IP address for use prior to any NAT and is allocated by the AP from a pool of allocatable IP addresses (or it may be an IP address forwarded to the AP 12 from another source (e.g. DCHP server 46)) responsive to the authentication being successfully completed.

The authentication server 44 comprises a suitable receiver arranged to provide means to receive communications such as, for example, signalling messages including authentication requests and meta-data messages, as well as data processor means arranged to process received communications and to communicate information to the SSG 38 to configure the SSG 38. Examples of received communications which are processed include authentication requests to authorise a device to use said roaming server if said request presents valid one or more authentication credentials, meta-data messages identifying authenticated devices. The headers of the meta-data messages are processed to extract IP address information from the source address field so that this can be stored in association with any authenticated roaming account information such as a device or user identifier extracted from the meta-data carried as payload by the message, for use in generating a control message to configure the SSG 38 to forward any traffic it receives from the roaming device 16 onwards towards its destination. The communications system will, if not otherwise provided by the AP 12 further comprise some suitable means to allocate a private IP address to an authenticated device. One or more NAT servers will operate to provide means arranged to perform network address translation on the allocated private IP address. If not provided by the authentication server 44, then the communications system may provide another platform or proxy server which includes a suitable receiver arranged to provide means to receive messages including meta-data from the access point (12), data processor means arranged to process a received message to: identify a device from meta-data provided by a received message, verify if the device identified by the message payload data is an authenticated device authorised to use said roaming service, extract from a source address field of a received meta-data message the IP address and store the extracted IP address as a source address for traffic authorised for onwards transmission, and to inform the SSG (or any other means provided in the communications system 10 which is arranged to act as gateway) to forward traffic (subsequently generated by the device 16) which when received has the IP address now stored as a source address authorised to use the roaming service. Traffic is this way forwarded for onwards transmission in said communications network towards a destination address, whereas any traffic not associated with an authenticated device authorised to use the roaming service may be dropped or otherwise not forwarded. The IP address of authorised traffic will comprise a network address translation of the private IP address allocated to the device which may have undergone one or more NAT transitions between the AP 12 and the SSG or equivalent gateway point.

Exemplary embodiments of the invention are described in detail herein above and pictorially in the accompanying drawings, however, the invention is not intended to be limited to such exemplary embodiments and includes various obvious modifications and equivalent arrangements which fall within the scope of the appended claims. Features referred to explicitly herein and in the claims may be replaced with alternative features providing functional equivalents where such functional equivalents would be known to those of ordinary skill in the art.

In the above description, references to "one embodiment," "an embodiment," "example embodiment," "various embodiments," etc., indicate that the embodiment(s) of the invention so described include a particular feature, structure, or characteristic. However, it is not necessary for every embodiment to comprise that particular feature, structure, or characteristic. Where the phrase "in one embodiment," or "in an exemplary embodiment," is referred to herein above it may or may not refer to the same embodiment as would be apparent to one of ordinary skill in the art.

Terms referring to features such as, for example, "processing," "computing," "calculating," "determining," or the like refer to an action and/or process(es) undertaken by a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The term "computing platform" comprises one or more data processors, where a data "processor" refers to any device or portion of a device that processes electronic data from registers and/or memory to transform that electronic data into other electronic data that is capable of being stored in registers and/or memory.

One or more embodiments of the invention include apparatuses for performing the operations herein. An apparatus may be specially constructed for the desired purposes, or it may comprise a general purpose device selectively activated or reconfigured by a program stored in the device.

Where appropriate, a feature described herein in an embodiment of the invention may be implemented in one or a combination of hardware, firmware, and software. Where a feature is implemented as instructions stored on a machine-readable medium, such instructions may be read and executed by a computing platform to perform one or more or all of the operations and/or method steps described herein.

The term "machine-readable medium" comprises any mechanism for storing or transmitting information in a form readable by a machine (e.g., a computer). Examples of machine-readable mediums include, but are not limited to: read only memory (ROM), random access memory (RAM), magnetic disk storage media, optical storage media, flash memory devices, and propagated electrical, optical, acoustical or other suitable digital and/or analogue signals (for example, carrier waves, infrared signals, digital signals, etc).

References to the term "computer program" and/or "computer control logic" include as appropriate references to machine code and/or executable code and/or source code which when compiled results in execution on a computing platform of the computer program.

A computer program may be provided in an electronically downloadable format or in a format which is stored in the main memory and/or secondary memory of a computing platform and/or data storage means capable of being attached and removed from a computing platform. Where a computer program is stored in one or more data storage means it comprises a computer program product. Such computer programs, when executed, are arranged to enable the computer platform or system to perform the features of the present invention as discussed herein. In particular, the computer programs, when executed, are arranged to enable a processor to implement one or more steps in a method according to an embodiment of the invention. Accordingly, such computer programs may represent data controllers of the computer system.

A computer program product comprising a computer readable medium having control logic (computer software) stored therein may be provided to distribute an embodiment of the invention or cause, when the product is loaded and running on one or more computer platforms, a method according to an embodiment of the invention to be performed. The control logic, when executed by one or more processors, causes the one or more processors to perform the functions of a method as described herein. The computer program product software may be loaded into a computer system using any appropriate means, including appropriate data storage reading means and/or via a network communications interface card. Software implementing control logic executed by a data processor may cause a processor to perform one or more or all of the functions of an embodiment of the invention as described herein. The computer program product software may run as a standalone software application program running in an operating system. Alternatively, it may be integrated into an operating system of the computing platform.

Features implemented primarily in hardware may comprise, but are not limited to, hardware components such as application specific integrated circuits (ASICs), field programmable gateways (FPGAs) or one or more state machines, etc. Any appropriate implementation of the hardware state machine so as to perform the functions described herein may be used as is apparent to a person or persons skilled in the relevant art(s).

The embodiments and examples discussed herein are non-limiting and are exemplary embodiments only and it will be apparent to those skilled in the art that changes and modifications may be made without departing from the spirit and scope of the invention, for example, as expressed in its aspects. The embodiments of the invention as defined in the claims are intended to cover all such changes and modifications as fall within the true spirit of the invention.

What is claimed is:

1. A method of identifying traffic generated by a device authorized to use a roaming communications service providing access via a wireless local area network to a communications system, wherein the method comprises:
    at an access point of the wireless local area network:
        receiving a request for roaming authorization from a roaming device which has made an association with a wireless communications network provided by the WLAN access point;
        processing the roaming service request by allocating an IP address to the device;
        generating, in response to allocating said IP address to an authorized device, a message including meta-data identifying authorized device and including in a source address field of the message an IP address allocated to the authorized device; and
        forwarding the meta-data message to a remote server;
    wherein, when said remote server receives said message, the message received has undergone network address translation of an IP address in the source field, and
    wherein the remote server associates said translated IP source address of said meta-data message with an authorized device identified by retrieving from a data structure an association between the extracted translated IP source address and a client device which is authorized to access said communications system, whereby subsequent traffic generated by said identified authorized device and having said translated source IP address is automatically authorized to use said roaming service in said communications system.

2. A method as claimed in claim 1, wherein the meta-data of the message identifies the authorized device using a device identifier.

3. A method as claimed in claim 2, wherein the device identifier comprises a media access control (MAC) address for the device.

4. A communications system for supporting devices roaming
    within a plurality of wireless local area networks, the communications system including:
    a plurality of wireless access points, each wireless access point providing at least one wireless local area network; and
    at least one authentication server; wherein
    each of the wireless access points constitutes a WLAN access point arranged to receive a request for roaming authorization from a roaming device which has made an association with a wireless communications network provided by the WLAN access point and to process the roaming service request by allocating an IP address to the device,
    said access point is further configured to generate, in response to allocating said IP address to an authorized device, a message including meta-data identifying the authenticated device and, in a source address field, the IP address allocated to the authenticated device, and to forward the message over said communications system;
    the authentication server to process a meta-data message received from a WLAN access point which has undergone network address translation, and is configured to:
    extract from a source address field of the received message an IP address;
    determine, from information extracted from the payload of said meta-data message, a device identity;
    verify that the device identity comprises a device identity of a previously authenticated roaming device, and
    store said IP address extracted from the source address field of said received meta-data message as a NAT translated IP source address for traffic from said authenticated device, whereby subsequent traffic generated by said device which undergoes the same network address translation is automatically authorized to use said roaming service to access said communications system.

* * * * *